United States Patent [19]
Hodge et al.

[11] Patent Number: 5,663,982
[45] Date of Patent: Sep. 2, 1997

[54] MODEM POOL DATA RATE ADJUSTING METHOD

[75] Inventors: Shannon Neil Hodge, Huntsville; Robby Wayne Armstrong, Brownsboro, both of Ala.

[73] Assignee: Motorola, Inc., Schaumburg, Ill.

[21] Appl. No.: 600,117

[22] Filed: Feb. 12, 1996

Related U.S. Application Data

[63] Continuation of Ser. No. 203,467, Feb. 28, 1994, abandoned.
[51] Int. Cl.$^6$ ........................... H04B 1/38
[52] U.S. Cl. ........................... 375/222; 375/225
[58] Field of Search ........................... 375/219, 220, 375/222, 225; 379/97, 98; 370/278, 282

[56] References Cited

U.S. PATENT DOCUMENTS 4,236,248  11/1980  Teramura et al. ........................... 375/121 X Primary Examiner—Stephen Chin
Assistant Examiner—Kevin Kim
Attorney, Agent, or Firm—Nancy R. Gamburd

[57] ABSTRACT

A first terminal (10) and a subscriber analog modem (20), operating at a data rate D, cause a modem pool analog modem (30), a modem pool digital modem (40), a subscriber digital modem (50), and a second terminal (60) to adjust their data rates to D. The two analog modems connect and then train, the modem pool analog modem thus adjusting its data rate to D. The two digital modems connect and then train, thus establishing an initial digital modem data rate. The modem pool analog modem sends D to the modem pool digital modem. The modem pool digital modem then sends D to the second terminal which, in turn, adjusts its data rate to D. The modem pool digital modem adjusts its data rate to D. The digital modems then re-train, thus causing the subscriber digital modem to adjust its data rate to D.

12 Claims, 2 Drawing Sheets

MODEM POOL DATA RATE ADJUSTING METHOD

This is a continuation of application Ser. No. 08/203,467, filed Feb. 28, 1994 and now abandoned.

FIELD OF THE INVENTION

This application relates to a method for analog and digital modems to establish connections with each other using modem pools including, but not limited to, a method for adjusting the data rates of such modems.

BACKGROUND OF THE INVENTION

The use of analog modems to transport user data over switched-access telephone channels is common. As is known, these devices transport user data by transforming the user data into analog signals and then transmitting the analog signals to a remote modem by means of a switched-access telephone channel.

Recently digital modems have been developed. As is known, digital modems—similar to analog modems—may be used to transport user data over switched-access telephone channels. In contrast to the analog modems, however, these devices transport user data by sending digital signals to a remote modem by means of a telephone channel. Because these digital modems transmit and receive digital signals, they are incompatible with analog modems, which transmit and receive only analog signals.

The problem of establishing a switched-access data communications session between a first subscriber using an analog modem and a second subscriber using a digital modem is known. One common solution includes equipping the serving central office with an analog modem coupled to a digital modem, with the modem-terminal interface of the analog modem being cross-wired to the modem-terminal interface of the digital modem. Thus, the analog modem's receive data ("RD") and, transmit data ("TD") leads is respectively coupled to the digital modem's TD and RD leads. Typically such arrangements are called "modem pools."

With this modem-pooling arrangement, the first subscriber's analog modem is connected to the central-office analog modem, while the second subscriber's digital modem is connected to the central-office digital modem. The first subscriber's analog modem now transmits analog-type data signals to the central-office analog modem, which presents the corresponding user data on its RD lead. In turn, this user data is applied to the central-office digital modem by means of the digital modem's TD lead. In turn, the central-office digital modem converts the user data to digital signals which are then transmitted to the second subscriber's digital modem.

There is a problem with such modem pools, however. This problem occurs when the first subscriber's analog modem and the second subscriber's digital modem initially operate at different data rates. In this situation, it is desirable to adjust the data rate of the second subscriber's digital modem equal to the data rate of the first subscriber terminal and analog modem. As a result of adjusting the data rates of the second subscriber's terminal and digital modem, a data communication link between the first subscriber's terminal and the second subscriber's terminal is established, and a data communications session may now proceed.

DESCRIPTION OF THE PREFERRED EMBODIMENT

Figure 1:
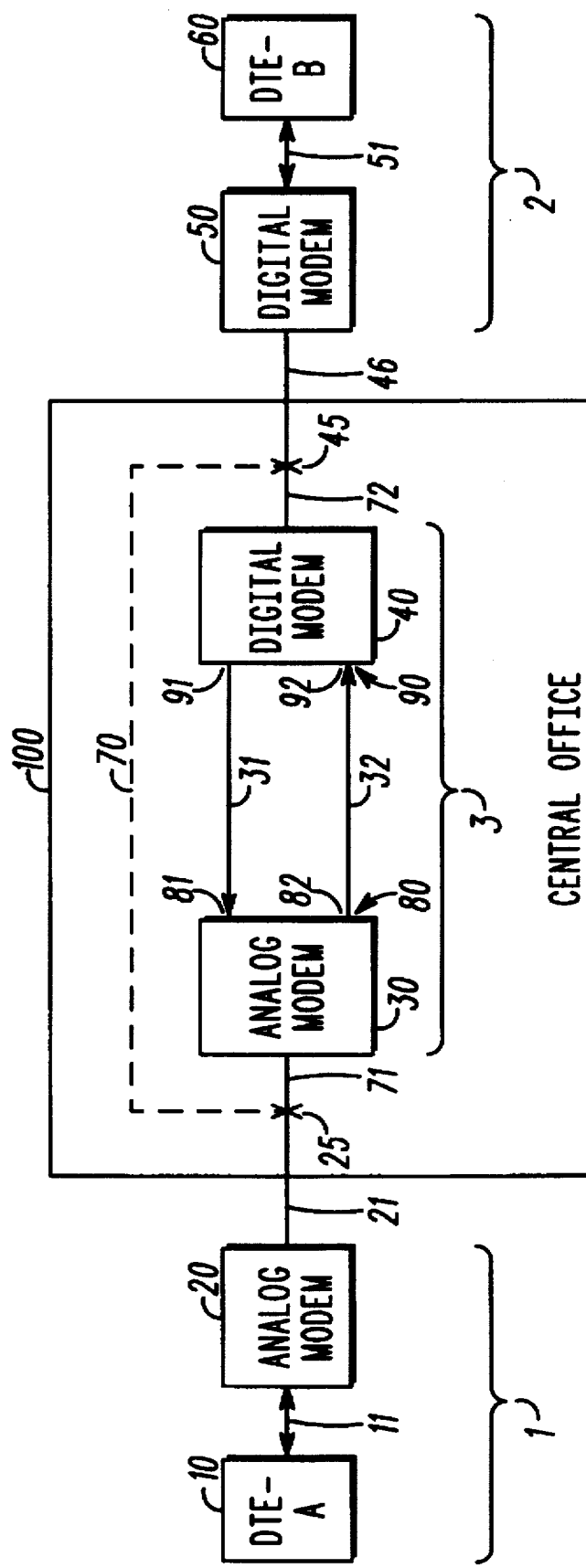
FIG. 1 is a block diagram showing a circuit suitable for demonstrating a first embodiment of a modem pool data rate adjusting method, in accordance with the present invention.

Referring to FIG. 1, there is shown a first subscriber terminal, or data terminal equipment ("DTE") designated "A," reference number 10, connected to a subscriber analog modem 20 by means of a modem-terminal interface (typically an RS232-type) 11, the DTE-A and the subscriber analog modem 20 being located at a first subscriber location or site 1.

There is also shown a second subscriber terminal, or DTE designated "B," reference number 60, connected to a subscriber digital modem 50 by means of a modem-terminal interface 51, the DTE-B and the subscriber digital modem 50 being located at a second subscriber location or site 2.

There is also shown a central office 100 including a first switch 25, a second switch 45 and a modem pool 3. As shown, the modem pool 3 comprises a modem pool analog modem 30 and a modem pool digital modem 40. As shown, the modem pool analog modem 30 includes a modem-terminal interface 80 including a transmit data input 81 and a receive data output 82. Also, the modem pool digital modem 40 includes a modem-terminal interface 90 including a receive data output 91 and a transmit data input 92. As shown, the modem pool digital modem 40 receive data output 91 is coupled to the modem pool analog modem 30 transmit data input 81 by means of a first channel 31. Also, the modem pool analog modem 30 receive data output 82 is coupled to the modem pool digital modem 40 transmit data input 92 by means of a second channel 32.

Further, the subscriber analog modem 20 is connected to the switch 25 by means of a first telephone dial access line 21; also, the subscriber digital modem 50 is connected to the second switch 45 by means of a second telephone dial access line 46.

Briefly, in accordance with the present invention, the first subscriber terminal (DTE-A) 10 and the subscriber analog modem 20, operating at a data rate D, cause the modem pool analog modem 30, the modem pool digital modem 40, the subscriber digital modem 50, and the second subscriber terminal (DTE-B) 60 to adjust their data rates to D. The two analog modems 20 and 30 connect and then train, the modem pool analog modem 30 thus adjusting its data rate to D. The two digital modems 40 and 50 connect and then train, thus establishing an initial digital modem data rate. The modem pool analog modem 30 sends D to the modem pool digital modem 40. The modem pool digital modem 40 then sends D to the second subscriber terminal 60 which, in turn, adjusts its data rate to D. The modem pool digital modem 40 adjusts its data rate to D. The digital modems 40 and 50 then re-train, thus causing the subscriber digital modem 50 to adjust its data rate to D.

In one embodiment, for example, the subscriber analog modem 20 and the modem pool analog modem 30 both comprise standard V.3225-type modems, available from Motorola, Inc. Also, the subscriber digital modem 50 comprises a standard DU-100-type modem, available from Motorola, Inc. Further, the modem pool digital modem 40 comprises a DU-100-type modem, available from Motorola, Inc., which has been modified as hereinafter described.

The operation of the circuit of FIG. 1 is now described.

First, it is assumed that the first subscriber terminal (DTE-A) 10 located at site 1 initiates a communication session with the second subscriber terminal (DTE-B) 60 located at site 2. It is further assumed that, once such data communications session is established, it is desirable to transport data at a data rate equal to the data rate of the DTE-A, this data being designated as the "desired data rate," or D.

In this case, the DTE-A, acting with the subscriber analog modem 20, informs the central office 100 common control (not shown) that it wishes to place a call to the DTE-B. As a result, the central office 100 establishes a switched connection between the subscriber analog modem 20 and the subscriber digital modem 50 by means of the line 21, the switch 25, a first path 70 (shown in dotted lines), the switch 45, and the line 46.

At this point, the central office 100 common control determines that immediate exchange of data between the two modems 20 and 50 is not possible, as the modem 20 is an analog device and the modem 50 is a digital device and, therefore, the two devices 20 and 50 are not compatible with each other.

As a result, the central office 100 then tears down the switched connecting path 70 between the subscriber analog modem 20 and the subscriber digital modem 50. Next, the central office 100 connects the subscriber analog modem 20 to the modem pool analog modem 30 by means of the line 21, first switch 25 and a second path 71; the central office also connects the subscriber digital modem 50 to the modem pool digital modem 40 by means of the line 46, the switch 45 and a third path 72.

At this point, the subscriber analog modem 20 and the modem pool analog modem 30 establish an analog data link by means of the line 21, the switch 25, and the path 71. The two analog modems 20 and 30 then proceed to train with each other. As a result of the training process, the analog modem 30 adjusts its data rate to match the data rate of the analog modem 20, which is determined by the data rate of DTE-A which, from above, is D.

At the same time, the modem pool digital modem 40 and the subscriber digital modem 50 establish a data link by means of the path 72, the switch 45, and the line 46. The digital modem 40 and the digital modem 50 then train with each other and, as a result, the modem pool digital modem 40 adjusts its data rate to the data rate of the subscriber digital modem 50, this data rate being designated the "initial digital modem data rate."

At this point, the modem pool digital modem 40 maintains the data link with the subscriber digital modem 50. In one embodiment, for example, the modem pool digital modem 40 maintains this data link by sending idle data to the subscriber digital modem 50. While doing this, the modem pool digital modem 40 waits to receive a signal from the modem pool analog modem 30, which signal will contain an indication of the data rate of the data link that has been established between the modem pool analog modem 30 and the subscriber analog modem 20. From above, this data rate is equal to D.

When the modem pool analog modem 30 has established a data link with the subscriber analog modem 20, the modem pool analog modem 30 will send a signal to the modem pool digital modem 40 by means of the modem pool analog modem 30 receive data output 82, the second channel 32, and the modem pool digital modem 40 transmit data input 92. The modem pool analog modem 30 generates the signal containing the desired data rate D as discussed below.

Both the modem pool analog modem 30 and the modem pool digital modem 40 are configured to operate at the same data rate such as, for example 9600 bits per second, after a reset or line on-hook. The modem pool analog modem 30, like most commercially-available modems of this type, is configured to send an ASCII-coded message with the rate that it trains to during a new connection. The message can be selected as ASCII-coded two-digit codes where each possible data rate is assigned a unique code or as a message made up of letters and numbers such as "connect 2400," where each possible rate is uniquely defined. In turn, the modem pool digital modem 40 is arranged for receiving this signal containing the rate D over the foregoing link, and decoding the rate D using an internal look-up table.

This data rate D may, of course, be different from the data rate of the data link that presently exists between the modem pool digital modem 40 and the subscriber digital modem 50. Assuming differing data rates, the circuit of FIG. 1 then proceeds as follows.

After the connection 46 between the modem pool digital modem 40 and modem 50 has been made, the modem pool digital modem 40 is further arranged for entering an "idle" state. In this state the modem pool digital modem 40 sends idle data codes to the subscriber digital modem 50 in order to maintain the connection 46 and at the same time waits to receive the data rate D from the modem pool analog modem 30. The modem pool digital modem 40 then generates an ASCII message in serial form, made up of the characters "CONNECT" followed by numbers indicating the data rate D such as, for example, "2400."

The modem pool digital modem 40 then sends the foregoing ASCII message in serial form to the DTE-B by means of the path 72, the switch 45, the line 46 and the subscriber digital modem 50 to inform the DTE-B of the desired data rate D. When the message has been sent, the modem pool digital modem 40 resumes sending idle data codes to the subscriber digital modem 50 to maintain the connection 46.

This ASCII message in serial form, of course, is transmitted at the initial digital modem data rate of the data link that was initially established between the modem pool digital modem 40 and the subscriber digital modem 50. Upon receipt of this message, the DTE-B adjusts its data rate to the desired data rate D.

After sending the ASCII message in serial form containing the data rate D, the modem pool digital modem 40 waits for a period of time (such as, for example, 0.1 second) to allow the message to be received by the DTE-B. The modem pool digital modem 40 then adjusts its data rate to D and initiates a retrain process with the subscriber digital modem 50 to cause the data rate of connection 46 to change to the new rate D. This retraining process is discussed below.

The modem pool digital modem 40 and the subscriber digital modem 50 transfer data over connection 46 using a data protocol known as "T-Link/KHP." This data protocol is supported by Northern Telecom, Inc., and is described in document TR-EOP-000277, Issue 1, September 1985, entitled "Datapath Network Access Interface Specification," published by Bell Communication Research, Inc. The T-Link/KHP protocol provides a means of changing the data rate of a connection between two digital modems without interrupting the data connection between them. As a result of this protocol, the modem pool digital modem 40 and the subscriber digital modem 50 are able to re-train and thus change the data rate of their active connection. In this embodiment, therefore, the modem pool digital modem 40 causes the subscriber digital modem 50 to re-train and change the connection 46 data rate to the new rate D using the re-train capability of the T-Link/KHP protocol.

A modem pool data rate adjusting method, in accordance with the present invention, may be implemented using any type digital modem for the modem pool digital modem 40 and the subscriber digital modem 50 so long as the digital modems used provide a means of making an initial data connection at one data rate and then later changing this data rate to another rate when commanded by one of the digital modems, and so long as the digital modems operate at data rates compatible with the modem pool analog modem used in the modem pool.

As a result of the modem pool digital modem 40 changing its data rate to the new data rate D, and further as a result of the modem pool digital modem 40 initiating a re-train process, the subscriber digital modem 50 is thereby forced to re-train with the modem pool digital modem 40 and, as a result of this re-training process, the subscriber modem 50 thereby adjusts its data rate to the new data rate D.

As a result of the foregoing process, the data link between the modem pool digital modem 40 and the subscriber digital modem 50 now operates at the same data rate D as does the data link between the subscriber analog modem 20 and the modem pool analog modem 30. This results in a data session being established between the DTE-A and the DTE-B at the data rate of the DTE-A which, from above, is the desired data rate D.

Second, it is assumed that the second subscriber terminal (DTE-B) 60 located at site 2 initiates a data communications session with the first subscriber terminal (DTE-A) 10 located at site 1. It is further assumed that, once such data communications session is established, it is desirable to transport data at a data rate equal to D, the data rate of the DTE-A.

In this case, the DTE-B, acting with the subscriber digital modem 50, informs the central office 100 common control that it wishes to place a call to the DTE-A. As a result, the central office 100 establishes a switched connection between the subscriber digital modem 50 and the subscriber analog modem 20 by means of the line 46, the switch 45, the path 70 (shown in dotted lines), the switch 25, and the line 21.

At this point, the central office 100 common control determines that immediate communication between the two modems 50 and 20 are not possible, as the subscriber digital modem 50 is a digital device and the modem 20 is an analog device and, therefore, the two devices 50 and 20 are incompatible with each other.

As a result, the central office 100 then tears down the switched connection 70 between the subscriber digital modem 50 and the subscriber analog modem 20. The central office 100 then connects the subscriber digital modem 50 to the modem pool digital modem 40 by means of the line 46, the switch 45 and the path 72; the central office also connects the subscriber analog modem 20 to the modem pool analog modem 30 by means of the line 21, the switch 25 and the path 71. From this point on, the operation is identical to the situation described above, wherein the first subscriber terminal (DTE-A) 10 initiates the communication session with the second subscriber terminal (DTE-B) 60.

Figure 2:
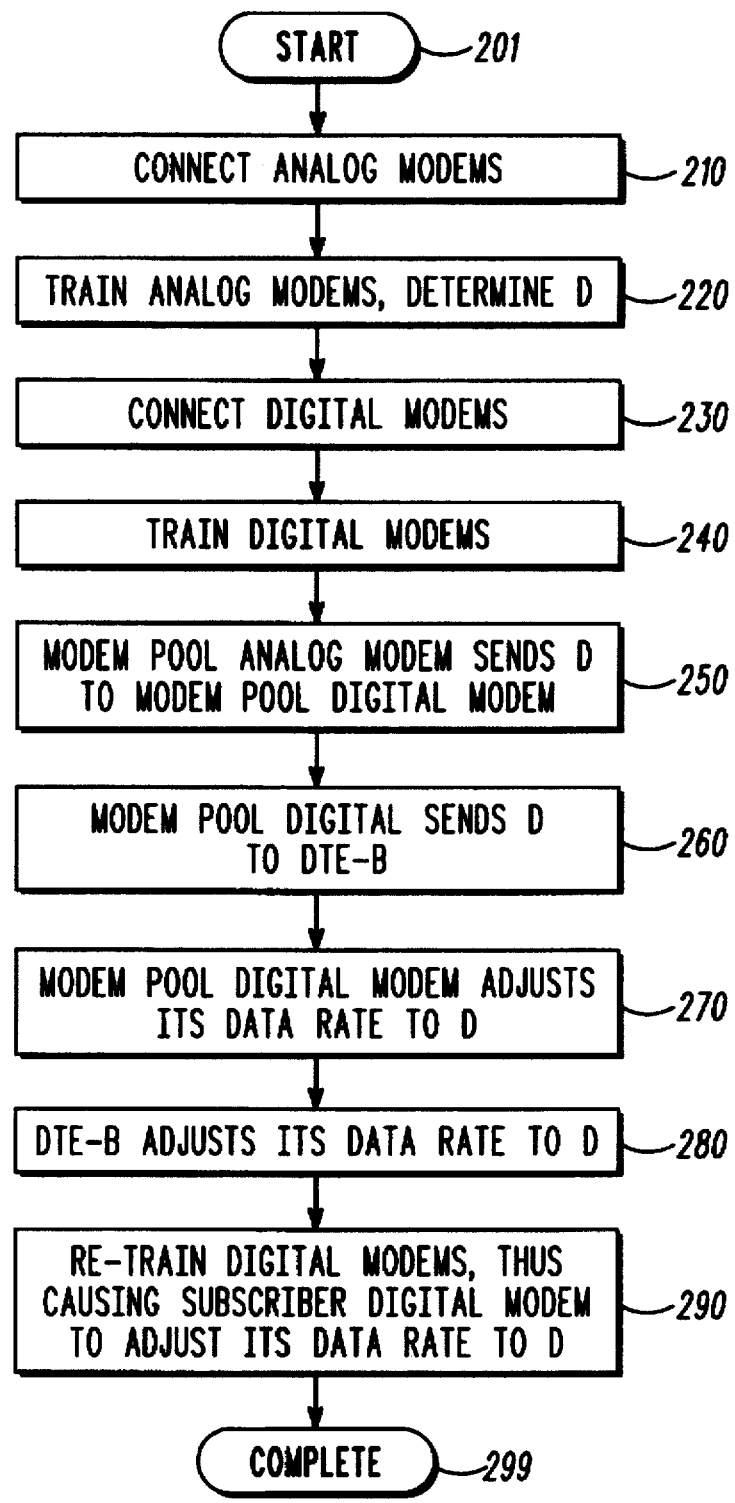
FIG. 2 is a flow diagram for FIG. 1.

Referring now to FIG. 2, there is shown a flow diagram for the modem pool data rate adjusting method described above in FIG. 1.

The process starts, step 201, and then proceeds to step 210, where a connection is established between the subscriber analog modem 20 and the modem pool analog modem 30.

In step 220, the subscriber analog modem 20 trains with the modem pool analog modem 30, the modem pool analog modem thus adjusting its data rate to D.

In step 230, a connection is established between the subscriber digital modem 50 and the modem pool digital modem 40.

In step 240, the subscriber digital modem 50 trains with the modem pool digital modem 40, thus establishing the initial digital modem data rate.

In step 250, the modem pool analog modem 30 sends D to the modem pool digital modem 40.

In step 260, the modem pool digital modem 40 sends D to the second subscriber terminal (DTE-B) 60.

In step 270, the modem pool digital modem 40 adjusts its data rate to D.

In step 280, responsive to receiving D, the second subscriber terminal (DTE-B) 60 adjusts its data rate to D.

In step 290, the modem pool digital modem 40 again trains with the subscriber digital modem 50, the subscriber digital modem 50 thus adjusting its data rate to D. The process is then complete, step 299.

In summary, a modem pool data rate adjusting method, in accordance with the present invention, allows an analog modem user and a digital modem user of a modem pool to establish a data connection with each other and to automatically adjust the rate of the data connection without human intervention. Moreover, a modem pool data rate adjusting method, in accordance with the present invention, allows a modem pool to automatically adapt to the data rate of an incoming or outgoing data calls between analog and digital lines.

One key advantage of the present invention over the prior art is that heretofore it simply was not possible to adjust the data rates of an analog modem and digital modem connected to each other by means of a modem pool. With reference to FIG. 1, the prior art thus required that a fixed data rate be established before setting-up a data connection between DTE-A and DTE-B. As a result, where DTE-A was located at a central site and DTE-B was located at one of several remote sites, it was thus impossible to establish a data connection unless the modems located at all sites operated at the same data rate or, in the alternative, unless a separate voice phone call was first made and the modem users manually adjusted the modem data rates at each end before setting-up the data call. In contrast, however, as a result of using the present invention, the data rates of DTE-A and DTE-B may be adjusted automatically, and without the requirement of human intervention on the part of the users.

In one application of the present invention, for example, an agency of the U.S. Government (i.e.,the Social Security Administration) uses a modem pool for incoming and outgoing calls. As a result of using the present invention, users of a wide variety of analog modems (various data rates starting at 300 bits per second and higher) can dial-access the agency and establish communication without operator intervention. In addition, by using the present invention, the agency is able to dial-access outside data services (such as, for example, Compuserve) through their existing modem pool, without the necessity of human intervention to set the data rate.

While various embodiments of a modem pool data rate adjusting method, in accordance with the present invention, have been described hereinabove, the scope of the invention is defined by the following claims.

What is claimed is:

1. In an arrangement comprising a first subscriber terminal coupled to a subscriber analog modem, the subscriber analog modem coupled to a modem pool analog modem, the modem pool analog modem coupled to a modem pool digital modem, the modem pool digital modem coupled to a subscriber digital modem, the subscriber digital modem coupled to a second subscriber terminal, the subscriber analog modem, the modem pool analog modem, the modem pool digital modem and the subscriber digital modem operable for data transmission at a plurality of data rates, the plurality of data rates including a data rate D, the first subscriber terminal and the subscriber analog modem operating at the data rate D of the plurality of data rates, a method for adjusting the data rates of the modem pool analog modem, the modem pool digital modem, the subscriber digital modem, and the second subscriber terminal to data rate D, the method comprising the steps of:

(a) the subscriber analog modem training with the modem pool analog modem, the modem pool analog modem thereby adjusting its data rate to data rate D of the plurality of data rates;

(b) the subscriber digital modem training with the modem pool digital modem, the subscriber digital modem and the modem pool digital modem thereby adjusting their data rates to an initial digital modem data rate of the plurality of data rates;

(c) the modem pool analog modem encoding the data rate D to form an encoded data rate D and transmitting the encoded data rate D to the modem pool digital modem;

(d) the modem pool digital modem transmitting the encoded data rate D to the second subscriber terminal via the subscriber digital modem;

(e) the modem pool digital modem adjusting its data rate from the initial digital modem data rate to data rate D of the plurality of data rates;

(f) responsive to receiving D, the second subscriber terminal adjusting its data rate from the initial digital modem data rate to data rate D of the plurality of data rates; and, (g) the modem pool digital modem re-training with the subscriber digital modem, the subscriber digital modem thereby adjusting its data rate to data rate D of the plurality of data rates.

2. The method of claim 1 further comprising a step of maintaining a communication link between the modem pool digital modem and the subscriber digital modem during the transmitting step (d).

3. The method of claim 2 further comprising a step of exchanging idle code between the modem pool digital modem and the subscriber digital modem in order to maintain the communications link therebetween.

4. The method of claim 1, wherein the encoding and transmitting step (c) further comprises a step of the modem pool analog modem transmitting an ASCII-encoded signal indicating data rate D to the modem pool digital modem.

5. The method of claim 1, wherein the transmitting step (d) further comprises a step of the modem pool digital modem generating an ASCII encoded message indicating data rate D and transmitting the ASCII encoded message indicating data rate D to the second subscriber terminal.

6. The method of claim 1 further comprising an initial step of establishing a connection between the subscriber analog modem and the modem pool analog modem.

7. The method of claim 1 further comprising an initial step of establishing a connection between the subscriber digital modem and the modem pool digital modem.

8. The method of claim 1, wherein the first subscriber terminal initiates the communication session with the second subscriber terminal.

9. The method of claim 1, wherein the second subscriber terminal initiates the communication session with the first subscriber terminal.

10. The method of claim 1, wherein the subscriber analog modem and the modem pool analog modem each comprises a V.3225-type modem.

11. The method of claim 1, wherein the modem pool analog modem and the modem pool digital modem are located in a central office.

12. The method of claim 1, wherein the subscriber digital modem comprises a DU-100-type modem.

* * * * *